INVENTOR
Aristovoulos G. Petzetakis

BY *Cushman, Darby & Cushman*
ATTORNEYS

Dec. 17, 1968  A. G. PETZETAKIS  3,416,982
METHOD OF FORMING A REINFORCED SEAMLESS TUBULAR ELEMENT
Filed Oct. 24, 1966  4 Sheets-Sheet 2

INVENTOR

Aristovoulos G. Petzetakis

BY Cushman, Darby & Cushman
ATTORNEYS

Dec. 17, 1968    A. G. PETZETAKIS    3,416,982
METHOD OF FORMING A REINFORCED SEAMLESS TUBULAR ELEMENT
Filed Oct. 24, 1966    4 Sheets-Sheet 4

INVENTOR.
ARISTOVOULOS G. PETZETAKIS
BY
Cushman, Darby Cushman
ATTORNEYS

United States Patent Office 3,416,982
Patented Dec. 17, 1968

3,416,982
METHOD OF FORMING A REINFORCED
SEAMLESS TUBULAR ELEMENT
Aristovoulos George Petzetakis, Thessaloniki and Chandri
Sts., Moschaton, Piraeus, Greece
Continuation-in-part of applications Ser. No. 220,291,
Aug. 29, 1962, and Ser. No. 337,692, Dec. 18,
1963. This application Oct. 24, 1966, Ser. No.
588,914
Claims priority, application Greece, Sept. 5, 1961,
24,307
14 Claims. (Cl. 156—193)

ABSTRACT OF THE DISCLOSURE

A method of forming integrally reinforced articles by continuously extruding a relatively high strength reinforcing core material coaxially within a continuously extruded stream of a softer matrix material and continuously extruding the coaxially disposed core and matrix materials to effect an intimate bond therebetween and provide a continuous integrally reinforced strip. A tubular element is then formed by winding the integrally reinforced strip upon itself in a helix and bonding the successive loops of the helix to one another. If desired, intermediate materials can be interposed between the core and matrix materials and coaxially extruded therewith.

---

The application is a continuation-in-part of my copending applications Ser. No. 220,291 filed Aug. 29, 1962, issued as U.S. Patent No. 3,290,727 and Ser. No. 337,692 filed Dec. 18, 1963, issued as U.S. Patent No. 3,299,908, which were based upon Greek patent application Ser. No. 24,307 filed Sept. 5, 1961.

The present invention relates generally to a method for the manufacture of rigid-flexible articles and more particularly to a method for producing integrally reinforced seamless rigid or flexible tubing, adapted to withstand an internal pressure or vacuum, as well as other integrally reinforced rigid-flexible composite articles such as conveyor belts, strips or the like. As the description herein progresses it will be apparent that any readily extrudable supply material such as synthetic resin and the like, can be employed in the method of the present invention. As used herein the term "synthetic resin material" embraces the use of any thermoplastic or thermosetting materials or mixtures thereof. In addition, the present invention contemplates within its scope the utilization of natural and synthetic rubbers and their mixtures with synthetic resins.

More especially, the present invention comprises a method for the manufacture of a tubular element comprising two plastic or readily extrudable materials compatible with each other wherein helical reinforcement is included in a matrix of softer material, and which tubular element can comprise not only a finished end product in and of itself but also an intermediate product or workpiece which is readily susceptible to further or subsequent working to produce other articles of commerce. While as aforementioned any plastic or readily extrudable materials which are compatible with one another can be utilized in practicing the present invention, thermoplastic materials are preferably employed. One embodiment of the present invention disclosed herein generally comprises the steps of continuously forming a composite strip comprising a relatively strong reinforcing core material embedded in and fused or bonded to a relatively soft matrix material and continuously fabricating therefrom a tubular structure in which said core material provides an integral helical or spiral reinforcement of the tubular wall formed by said matrix material.

Accordingly, it is a principal object of the present invention to provide a novel method for forming seamless tubing having integral reinforcement to provide maximum mechanical strength by effecting a substantially perfect bond between the matrix and reinforcement of the tubing.

It is a further objective of the invention to provide for the manufacture of reinforced seamless tubing having any desired flexibility or rigidity with optimum resistance to radial pressures without impairing the axial strength thereof and without impeding the flow of matter through said tubing and wherein the reinforcing material replaces an equal quantity of the softer material in the wall of the tubing, so that the total quantity of material used for the production of the reinforced tubing does not exceed that which would be required for the production of a non-reinforced tubing. This objective is obtained by creating maximum bursting resistance with minimum material.

It is a further objective of the invention to provide a novel method for the manufacture of rigid-flexible articles and more particularly of articles integrally reinforced with a reinforcement having a determined cross-section whereby two materials compatible with each other but of different plasticity are simultaneously extruded through a fixed head, the harder material being extruded within the stream matrix of the softer material at a determined cross-section at the initial phase of the process, while at the subsequent phases of the process during which the fashion for the formation of the finished end product is performed, only the soft matrix is fashioned and the harder material maintains its initial cross-section owing to the said difference of plasticity of the two materials.

It is a further objective of the invention to provide a novel means for the economic bonding of thermoplastic materials of differing hardness and other physical characteristics and to distribute them in the proper way for building the wall of a reinforced tubing.

Other objects and the entire scope of the present invention will become apparent from the following detailed description and by reference to the accompanying drawings. It should be understood, however, that the detailed description and specific examples, while indicating prefered embodiments of the invention, are given by way of illustration only, since various changes and modifications within the spirit and scope of the invention will become apparent as the description herein progresses. Reference is now being made to the accompanying drawings which form a part hereof, wherein:

FIGURE 1 is a vertical sectional view of an apparatus employing the method of the present invention;

FIGURES 2, 3, 4, and 5 are sections of various tubular elements manufactured according to the present invention utilizing the apparatus shown in FIGURE 1;

Figure 1:
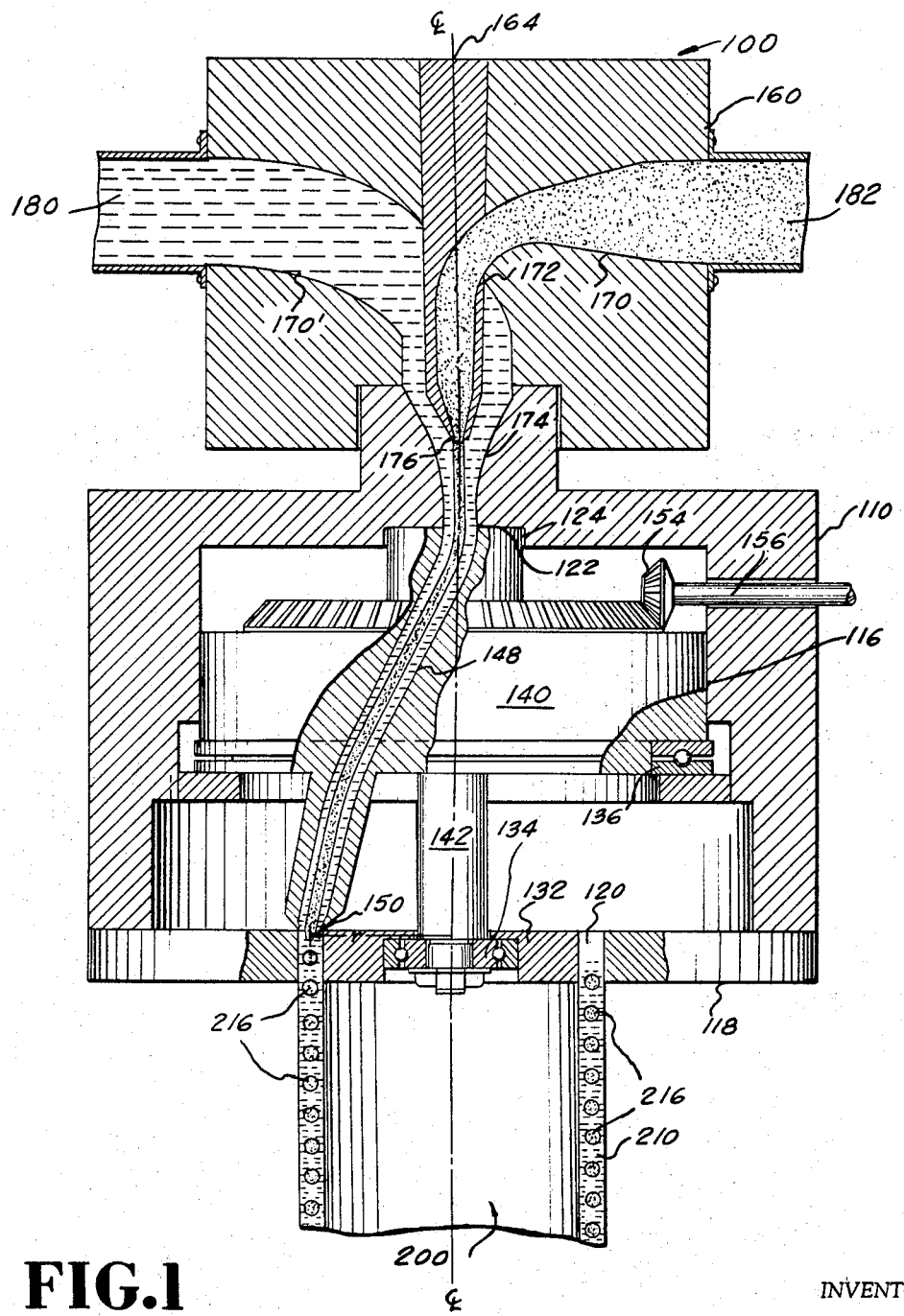

Broadly, the invention comprises initially uniting plastic materials of different hardness characteristics in a common channel in which a plastic core comprising the harder material is embedded, either with or without an intermediate material, in a more ductile, softer matrix to form a supply of effluent of uniform width in the form of a strip, with a reinforced or wick-like center which is deposited upon itself. The respective plastic materials forming the matrix and the core are simultaneously extruded through a fixed head concentrically of each other under great extrusion pressure and consequent heat and thereupon conducted to a bonding station. In the process, the combined matrix and its core are intimately and inseparably bonded, and thereafter rotated in a path of deviation from the initial direction of flow (central line), through a rotating head which is in substantially continuous contact with the fixed channel through which the respective matrix and reinforcing core has passed and were joined. The effect of this rotation is to form a substantially circular track for lapped deposition of the combined materials by ejection of the same from a nozzle and through dies, wherein by compression of the ejected and combined matrix and its core, helices are formed between contiguous sides of the matrix and whereby, because of the malleability or soft plastic condition of the softer matrix an endless reinforced integral tubular element is created. It is inherent in the aforementioned process that the softer plastic material forming the matrix is in a molten condition relative to the harder core within the matrix comprising the spiral reinforcement. In fact, the bonded materials are forced under continuous pressure through dies in a winding fashion. This combined winding-extrusion through a guide causes the formation of a flowing strip, which winds, continuously upon itself. The spirals of the winding deposit, retaining the heat of pressure, remain soft; they overlap and fuse together forming thereby a continuous seamless wall in which is embedded the spiral or helical reinforcement. The tubing thus formed is of circular cross-section, having a continuous spiral core throughout its length, the latter providing controlled reinforcement.

In other words, according to the present invention, a hollow tube of synthetic resin material is made by continuously extruding a core of a first material having a comparatively high mechanical strength, simultaneously extruding a second material which is comparatively soft and plastic around the first material, subjecting the materials to sufficient pressure to form a firm bond between them, pushing the materials through a rotating nozzle, and winding the emerging material on itself in a guide so that the softer material fuses to form a continuous hollow tube incorporating a spiral core of the stronger material.

It should be apparent that in utilizing apparatus employing the present invention the two materials, which are of different hardness and plasticity, are strongly bonded or fused together in the initial phase of the process under high pressure and temperature, while at the last phase of the process only the sealing of the homogeneous and soft covering or matrix material is involved, which is easily achieved by relatively insignificant pressure.

The covering of the hard core with the softer material in the initial phase of the process aims also at facilitating the passage of the harder core through the narrow channels, since the softer material is interposed between the hard core and the metallic inner surfaces of the channels and acts as a lubricant conveying with it the hard core. This makes it possible for the strengthening spiral core to be made of very hard materials which are normally very difficult to extrude. Also, by elongating the narrow channel in the rotating head and by adjusting the corresponding displacement of the nozzle to various distances from its axis of rotation, tubes of different and very large diameters can be obtained. Similarly, as will be described in greater detail hereinafter, additional materials can, if desired, be co-extruded intermediate the matrix and reinforcing core.

A particular advantage of the present invention resides in the provision for a regular and continuous flow of the extruded mass through the extrusion head. This is achieved by means of the passage of the combined matrix and core through a fairly narrow "lubricated" channel up to the die. In the art, extrusion methods heretofore employed result in an irregular flow of the mass into the head which in turn results in the presence of joining lines along the formed tubular element, caused by supports such as spiders and the like. This latter mentioned difficulty of the prior art is an especially significant detriment to the manufacture of tubes of large diameter. The present invention which overcomes such typical drawbacks of the prior art, will be seen to particularly and readily lend itself to the fabrication of tubes of unusually great diameters.

In practice, the two materials, after having been bonded in the form of a strip or cord, move together at the same linear speed through a common channel. It will be apparent, however, that should the rate of turn of either the extruder screw or the feeding of the respective channels be varied, the quantitative relation of the one material to the other would be affected. Since both materials, when joined, pass simultaneously through a channel of given diameter, the diameter of the rigid spiral would thus increase or decrease according to the rate of production of the rigid material in relation to the rate of production of the softer material comprising the matrix. This is inherent in the process. The diameter, therefore, of the reinforcing material is directly proportionate to its rate of production as related to that of the softer material. In practice also, the rotational speed of the extrusion head, while variable, should be such that the circumferential velocity of the extrusion nozzle which is adjacent to the die or guide is substantially equal to the linear velocity of the strip of the combined material which is extruded through the nozzle.

Owing to the fact that the axes of both channels in the fixed and the rotating heads at their joining point or juncture coincide with the axis of rotation, it is evident that the material, in the form of the said cord, when entering the channel of the rotating head, will, in addition to its linear movement, also suffer a twisting action around its own axis at the rate of one turn for every complete revolution of the rotating head. When the materials are in a plastic condition, such twisting action has no significance. However, it is obvious that in order to obtain a tube with a uniform wall, it is necessary that at this joining point of the two heads the materials are disposed concentrically of each other and are of circular cross-section.

The thickness of the spiral core, its pitch, as well as the thickness of the wall of the tube can be varied according to the specific requirements of the type of tube desired to be obtained and also to the properties of the materials used. According to the elasticity of the softer material, tubes of different and very high flexibility can be obtained in which the embedded spiral core of the hard material makes the tube equally strong to withstand high internal pressure or vacuums.

The present method of forming tubular elements, by which the strong core is firmly bonded approximately in the center of the softer wall, provides a tube of great strength using only a relatively small quantity of materials. While the reinforcing spiral core increases the resistance of the tube in its circumferential direction to radial pressures (where the greatest forces act), it does not deleteriously affect (owing to the aforesaid perfect bonding of the two materials) its resistance in its longitudinal direction, i.e., its axial strength. Moreover, since the spiral core forms an integral part of the wall of the tube, it is obvious that by the method of the present invention the tube is reinforced without using more volume of material than that which would be required for the production of a similar (same size) but non-reinforced tube.

In addition, it will be apparent to those skilled in the art that a tubular element after being manufactured according to the present invention, can be further processed, as for instance by coating externally or internally lining the tube with other protective materials, or by further forming the same into other articles such as strips, belting or the like.

The fact that the passage of the materials from the fixed head into the rotating head is effected through channels of small circular cross-section eliminates the problems of tightness and friction at the contact of the two heads, although the materials passing through this section are subjected to high pressure. As a result of the foregoing a simple and sturdy construction of the apparatus carrying out this process is possible.

Referring now to FIGURE 1 of the drawings, it will be seen that the apparatus 100 illustrated therein is designed for the simultaneous extrusion of two separate thermoplastic materials. A fixed head 160 has two inlets 182 and 180. Inlet 182 communicates through the conduit means or channel 170 and its extension 172 in the dowel 164, with the circular section orifice 176 which is in material ejecting communication with the center of a first common channel 174.

Similarly, the inlet 180 communicates through the conduit means or channel 170' with the common channel 174 which is situated in a second fixed member 110. Inside the fixed member 110 is a rotatable member 140 driven by a cooperating toothed wheel 154 which is connected through a shaft 156 to a variable speed motor (not shown). The member 140 is rotatable about the axis CL which, in the embodiment of the invention illustrated, is the center line of the apparatus. This rotatable member 140 rotationally engages the bearings 124, 116, and 136.

The rotatable member 140 has a conduit means or channel 148 which connects with the channel 174 of the fixed member, so that at their connection point 122 the axis of each channel coincides with the axis of rotation. The two channels must both be of circular cross-section at their connection so that they will be in continuous communication while the one rotates.

Channel 148 leads to, and is in communication with, a nozzle 150 integral with the rotating member 140, which nozzle 150 is displaced a distance $r$ from the axis of rotation CL, so that as member 140 is rotated the nozzle 150 describes a circular track of radius $r$ around the axis. Corresponding to this circular track is a gap 120 formed between circular dies 118 and 132. The external die 118 is fixed to the member 110, while the internal die 132 is supported by the shaft 142 of the rotating member upon the bearing 134.

In operation of the apparatus utilizing the present invention, a mechanically strong material such as rigid PVC (polyvinyl chloride) is forced through inlet 182 and orifice 176 under continuous pressure from the extruder, into the center of a stream of softer material, such as soft plasticized PVC which, having been forced through the inlet 180 and channel 170', moves along the channel 174.

The temperature of the rigid PVC passing through the extrusion head 160 and issuing from the orifice 176 is about 190–200° C. while the temperature of the softer, plasticized PVC passing through the head 160 and issuing around the orifice 176 is about 160–180° C. Therefore, upon the intimate contact of the two materials in the channel 174, a temperature equalizing heat exchange will take place resulting in a lowering of the temperature of the rigid PVC and raising of the temperature of the plasticized PVC and a consequent increase in the difference in plasticity between the two materials during their co-extrusion. The thus co-axially disposed materials are pushed together through the channel 174 and as they are forced to pass through narrow channels they are subjected to high pressure and are firmly fused or bonded together to form a hard core which is inseparable, when cooled, from the surrounding matrix layer of softer, more plastic material.

The materials so bonded are forced, under the continuous pressure exerted from the extruders, to pass from the channel 174 of the fixed head to the channel 148 of the rotating head and through the channel 148 where they are led to the nozzle 150 from which they are ejected into the gap 120 between the dies 118 and 132 while the nozzle is at the same time rotating.

The correlation between the rotational speed of the nozzle and the extrusion speed of the materials through it is such that the nozzle, during its rotation, deposits continuously on its circular track a strip of material which is wound on itself in a helix or spiral, so that the successive loops of the still hot, plastic, surrounding or matrix portion of the strip which is formed of the softer material fuse to form a continuous wall without a seam, thus giving a circular section hollow tube 200 whose wall 210 incorporates an integral strengthening spiral core 216 and which tube is pushed forward by the succeeding material ejected continuously from the nozzle.

It will be obvious that by extruding the hard material through the small orifice at 176, an improvement in its physical properties is obtained. A modification of this method will occur to those skilled in the art, whereby a stretching of the comparatively rigid spiral reinforcing material may be effected when using materials that are susceptible to orientation. If the section of the channel through which the combined materials pass is reduced in cross-section as at 148, one diminishes the diameter of the core whereupon by accelerating the speed of the passage of the core through the channel an automatic stretching of the core within the matrix occurs ensuring a relative orientation assuming, of course, the appropriate temperatures are maintained.

A tube of maximum strength is manufactured according to the present invention in a continuous and substantially automatic process using the smallest possible quantity of materials. Due to the bond between the respective matrix and core, it is quite unnecessary for a great thickness of the soft material to surround the core. As previously indicated, the diameter of the reinforcing spiral is directly proportionate to the rate of production of the hard material as related to that of the softer material. In this connection, attention is directed to FIGS. 2, 3, 4, and 5, which illustrate samples of tubes which can be produced utilizing the method of the present invention and utilizing the apparatus illustrated in FIGURE 1 including the same dies.

Figure 2:
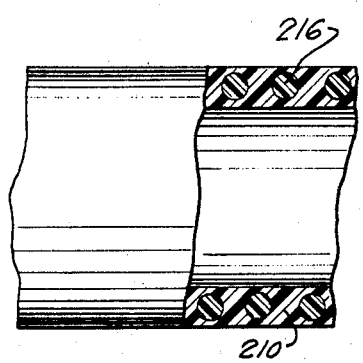

FIGURE 2 particularly illustrates a tube integrally reinforced with a spiral of small diameter.

Figure 3:
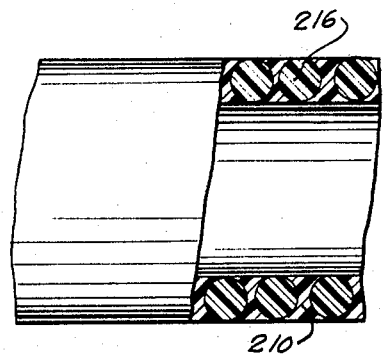

By increasing the rate of extrusion of the hard material and by decreasing at the same time the rate of extrusion of the soft material, the diameter of the reinforcing spiral increases as shown in FIGURE 3 in which the diameter of the spiral has attained its maximum, being the thickness of the wall of the tube.

Figure 4:
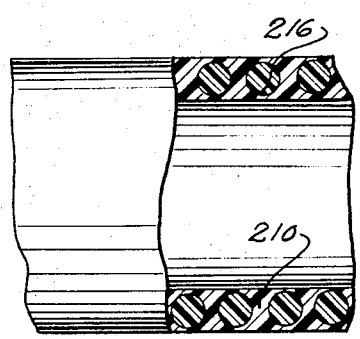

FIGURE 4 illustrates a tube with a reinforcing spiral of medium diameter.

Figure 5:
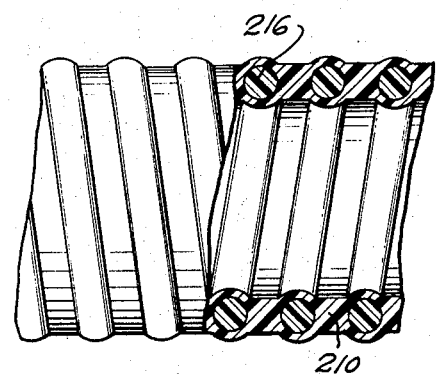

Finally, the tube in FIGURE 5 is derived from that illustrated in FIGURE 4, when the tube extruded from the apparatus as in FIGURE 4 is stretched by a continuous take-off at a high speed before it solidifies by cooling, whereby the tube being stretched becomes thinner at the points 210 of the soft material.

Figure 6:
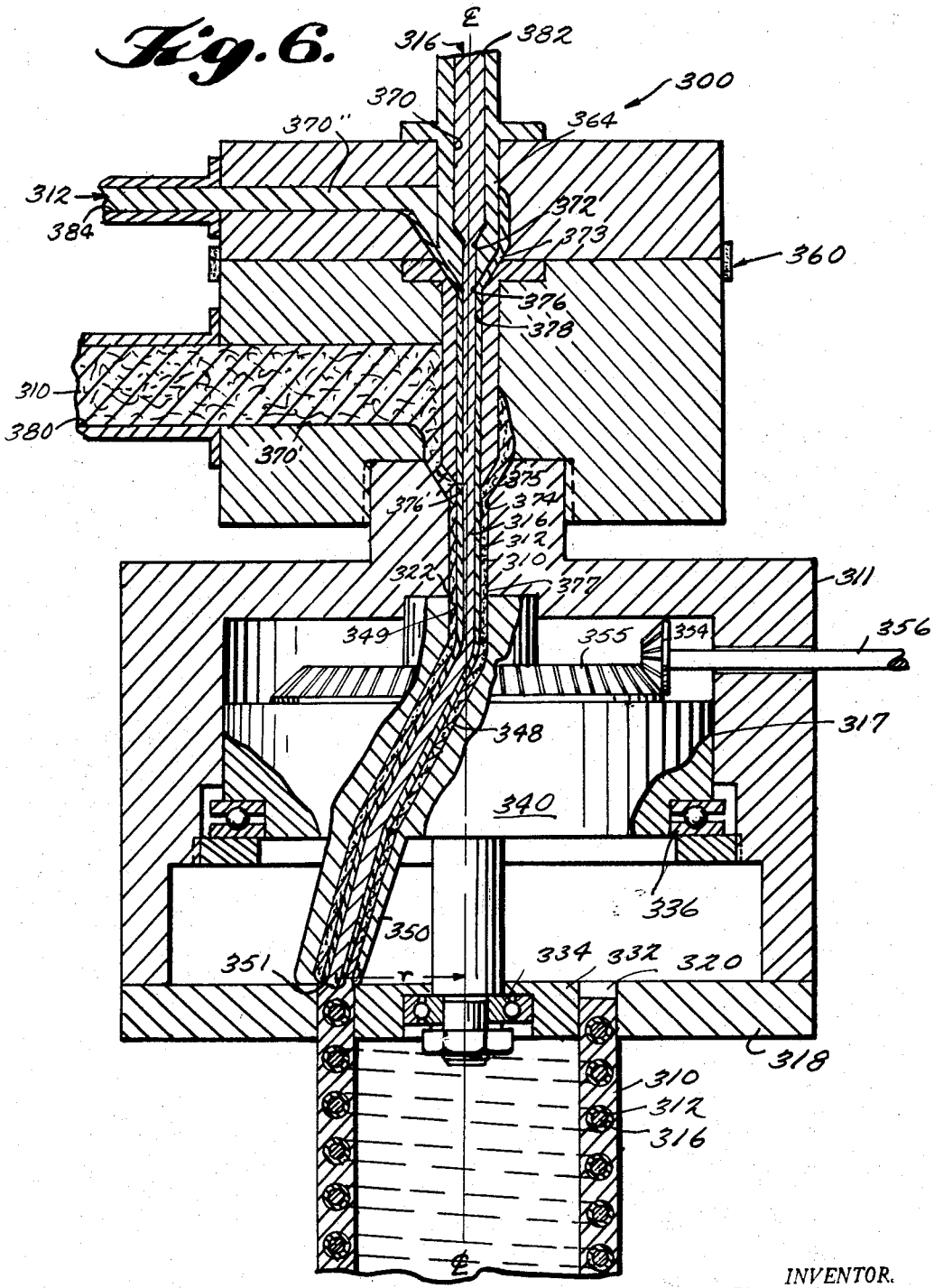
FIGURE 6 is a vertical section of an apparatus employing a modified form of the present invention.

Referring now to FIGURE 6 of the drawings, there is shown a modification of the present invention wherein an apparatus 300 is utilized for the simultaneous extrusion of three separate plastic materials comprising specifically a matrix material 310, a core material 316, and an intermediate material 312. To this end the apparatus 300 differs from the apparatus 100 heretofore described by reference to FIGURE 1 in that in addition to the inlets 380 and 382 for the matrix material 310 and core material 316, respectively, the fixed head assembly 360 includes a third inlet 384 for the intermediate material 312 which is to be continuously interposed between the matrix and core materials. As with apparatus 100, each of the inlets 380, 382, and 384 are operatively connected to suitable extruders (not shown) so as to receive a continuous supply of their respective plastic materials therefrom.

The inlet 382, for the core material 316, communicates through the conduit means or channel 370 and its reduced extension 372 in the dowel 364 with the circular section extrusion orifice 376 which is in material ejecting communication with the center of a first common conduit means or channel 378. Similarly, the inlet 384, for the intermediate material 312, communicates through the conduit means or channel 370″ and its reduced extension 373 with the first common channel 378 so as to convergingly discharge the intermediate material 312 about the strip of core material 316 issuing from the extrusion orifice 376. The first common channel 378 will be seen to extend through the fixed head assembly 360 and terminate in a circular section extrusion orifice 376′ which is in material ejecting communication with the center of the converging mouth 375 of a second common conduit means or channel 374 which is situated in a second fixed member 311. The inlet 380, for the matrix material 310, communicates through the conduit means or channel 370′ with the converging mouth 375 of the second common channel 374 so that the matrix material 310 will be convergingly discharged about the composite strip comprising the core material 316 and intermediate material 312 issuing from the extrusion orifice 376′.

As in the construction of the corresponding portion of the apparatus 100, the second fixed member 311 of the apparatus 300 has disposed therewithin a rotatable member 340 which is in rotational engagement with the bearing 317, 324, and 336. The rotatable member 340 is rotatably driven about the axis CL which, as in the previous embodiment, is the center line of the apparatus 300, by means of a suitable toothed wheel or gear 355 carried by the rotatable member 340 which is drivingly interengaged with a cooperating toothed wheel or gear 354 connected by means of a rotatable shaft 356 to a suitable variable speed motor (not shown).

The rotatable member 340 includes a third common conduit means or channel 348 which is in fluid communication at its inlet end 349 with the outlet end 377 of the second common channel 374 at the juncture or connection point 322 of the fixed member 311 and the rotatable member 340. As in the previous embodiment, the channels 348 and 374 will be in continuous fluid communication throughout the rotation of the rotatable member 340 since at their juncture 322, the longitudinal axes of the inlet end 349 of the channel 348, and the outlet end 377 of the channel 374 coincide with the axis of rotation CL and the cross section of each channel is circular.

The channel 348 leads to, and is in fluid communication with, a discharge nozzle 350 integral with the rotating member 340 and having its discharge orifice 351 displaced radially a distance r from the axis of rotation CL, so that as the member 340 rotates the discharge orifice 351 of the nozzle 350 describes a circular track of radius r about the axis CL. As in the previous embodiment of the invention, the circular dies 318 and 332 define a circular slot or gap 320 which corresponds to the circular track of the discharge orifice 351 and is in continuous material receiving communication therewith. The external die 318 is carried by the depending skirt portion of the fixed member 311, while the internal die 332 is supported by the shaft 342 of the rotating member upon the bearing 334.

This modification of the present invention wherein three separate plastic materials are simultaneounly coaxially extruded is of particular utility when the materials selected for the matrix and core will not satisfactorily bond directly to one another or are otherwise incompatible when in direct contact. Thus, according to the present invention such incompatibility between particular matrix and core materials can be readily and effectively overcome by means of an intermedite material which is compatible with, and will intimately bond directly to, both the matrix and core materials. For example, rigid PVC and natural rubber, incompatible materials which cannot normally be effectively bonded directly to one another, can be utilized for the core and matrix, respectively, when according to the present invention an intermediate material, such as butadiene acrylonitrile rubber which is compatible with, and will intimately bond directly to, both rigid PVC and natural rubber, is employed as an intermediate bonding layer. Thus, utilizing the apparatus 300, mechanically strong rigid PVC, core material 316 is forced through the inlet 382, its reduced extension 372 and the orifice 376 under continuous pressure from an extruder (not shown), into the center of a stream of nitrile rubber intermediate material 312 which, under continuous pressure from its extruder (not shown) having been forced through the inlet 384, the channel 370″ and its reduced extension 373, moves along the first common channel 378. The thus coaxially disposed materials 316 and 312 are forced firmly and intimately into bonding contact as they are pushed together into and through the first common channel 378 and issue as a composite strip from the extrusion orifice 376′ into the center of a stream of natural rubber matrix material 310. The natural rubber matrix material 310 which, under continuous pressure from its extruder (not shown) has been forced through the inlet 380 and the channel 370′, moves into the converging mouth 375 and along the second common channel 374. The thus coaxially disposed PVC core material 316 and the natural rubber matrix material 310 are forced firmly and intimately into bonding contact with the intermediate layer of nitrile rubber 312 as the three coaxially disposed materials are pushed together into and through the second common channel 374 where because of the high pressure and temperature they are firmly fused or bonded together to form an integral composite strip having a hard mechanically strong core and a soft more palstic matrix which are inseparable when cooled from the intermediate bonding layer. The temperatures which should be attained and maintained during the extrusion and bonding, of course, depend upon the particular materials employed in the process; however, they are the generally well-known standard extrusion temperatures for the particular materials. In addition, as will be apparent to those skilled in the art, if necessary heat, in addition to that generated by the passage of the materials through the narrow extrusion channels of the apparatus, can be supplied to the materials by suitable heating means (not shown) such as electric coils or the like operatively arranged with respect to the apparatus.

The composite strip, comprising the coaxially disposed rigid PVC core 316, the nitrile rubber intermediate material 312 and the natural rubber matrix material 310, intimately bonded one to the other as aforementioned, is forced under the continuous pressure exerted from the extruders, to pass from the second common channel 374 in the fixed member 311 into the third common channel 348 of the rotating head 340 where it is led to the nozzle 350 from which it is continuously ejected through the consequently continuously rotating orifice 351 into the circular gap 320 between the dies 318 and 332.

As in the previously described embodiment of the invention, the correlation between the rotational speed of the nozzle 350 and the extrusion speed of the coaxially disposed bonded materials therethrough, is such that the nozzle, during its rotation, continuously deposits on its circular track, a strip of composite material which is wound upon itself in a continuous helix or spiral. Thus, the successive loops of the still hot, plastic matrix portion 310 of the strip which, in the present example, comprises natural rubber, fuse to one another to form a continuous wall without a seam and thus continuously produce a hollow tubular element 400 of circular cross-section whose wall incorporates a strengthening spiral core 316 continuously intimately and inseparably bonded to the natural rubber matrix 310 by means of the continuous intermediate layer or sheath 312 of nitrile rubber material. Of course, when the desired length of tubing has been formed, it may be severed from the tubular element issuing from the circular gap 320.

Figure 7:
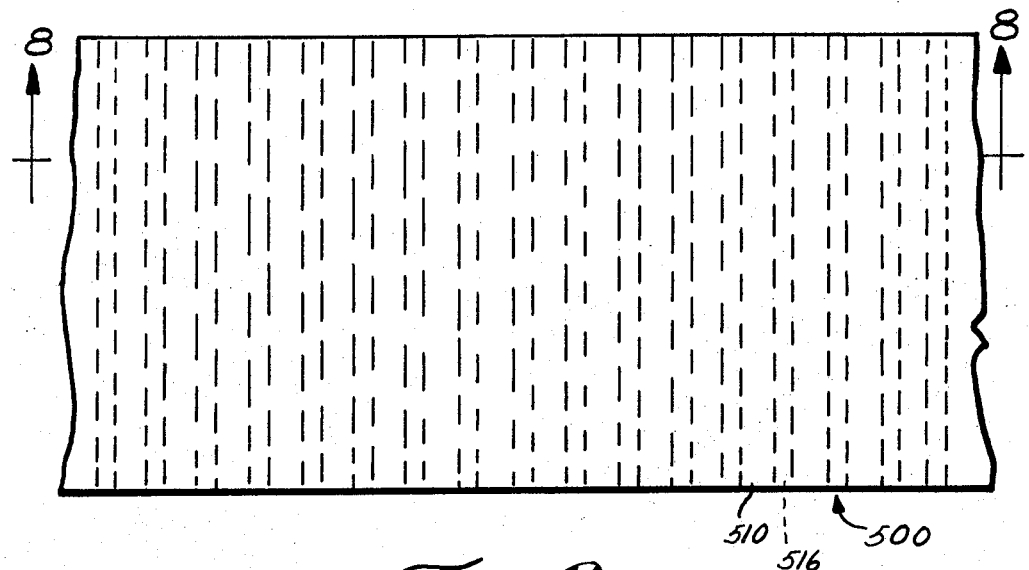
FIGURE 7 is a fragmentary plan view of a section of belting manufactured according to the present invention.
Figure 8:
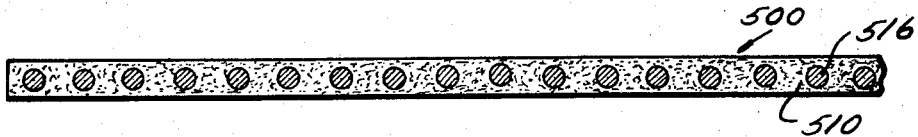
FIGURE 8 is a longitudinal sectional view taken generally along the line 8—8 of FIGURE 7.

Referring now to FIGURES 7 and 8 of the drawings, there is shown a section of a length of an integrally reinforced flat belt 500 produced according to the present invention. The belt 500 comprises a relatively soft plastic matrix material 510, for example plasticized PVC, in which there is embedded and intimately bonded a plurality of laterally extending, longitudinally spaced reinforcing elements 516, formed of a strong rigid material, such as rigid PVC. The flat belt 500 can be readily formed by slitting or cutting an integrally reinforced tubular element, such as the tubular element 200, FIGURE 1, longitudinally, subsequent to its issuance from the circular gap 120 between the dies 118 and 132. After slitting, which can, of course, be accomplished continuously as the tube issues from the apparatus 100, the resulting web, formed by the longitudinally slit tubular wall, is flattened while plastically permanently deformable, by suitable means such as by being spread over a flat plane surface or passed over suitable rolls, and can thereafter be wound into suitable rolls or upon take-up reels for convenient storage prior to further processing. As will be apparent to those skilled in the art, when the matrix and integral reinforcing core of the tubular workpiece element comprise thermoplastic, as opposed to thermosetting materials, the development thereof into a flat belt or strip by slitting and flattening can be readily accomplished any convenient time after the materials have cooled sufficiently to assume a permanent set by merely heating the composite web during flattening.

Such a flat development of an integrally spirally reinforced tube as the belt 500 will, by virtue of the integral rigid, laterally extending, longitudinally spaced, reinforcing elements 516, exhibit considerable rigidity about its longitudinal axis but will be sufficiently flexible about transverse axes, i.e. longitudinally flexible, that it can be readily led or wound about pulleys or rollers. The integrally reinforced belt 500 thus, as will be readily appreciated, finds particular utility as a conveyor belt.

While integrally reinforced tubular elements and flat strips or belts have been particularly shown and described, it will be apparent that other rigid-flexible products can be readily manufactured according to the method of the present invention.

It will thus be seen that the objects of this invention have been fully and effectively accomplished. It will be realized, however, that the foregoing specific embodiments have been shown and described only for the purpose of illustrating the principles of this invention and are subject to extensive change without departure from such principles. Therefore, it will be understood that this invention includes all modifications encompassed within the spirit and scope of the following claims.

What is claimed is:

1. A method of forming an integrally reinforced seamless tubular element comprising the steps of: continuously extruding a strip of a first material which is comparatively soft and plastic; simultaneously continuously extruding a second material having a comparatively high mechanical strength and injecting the said second material into the center of the strip of the first material as a core; continuously extruding the thus disposed first and second materials to form by heat and pressure a firm intimate bond therebetween and thereby provide an axially advancing integrally reinforced composite strip; moving said composite strip laterally in a closed path corresponding to the cross-sectional configuration of the tubular element to be formed while simultaneously continuing the axial advance of said composite strip; guiding said composite strip so that it winds upon itself in a helix; and bonding the successive loops of said helix to one another to thereby form a tubular element having a seamless tubular wall formed of the first material and an integral reinforcing spiral of the second material intimately bonded thereto.

2. The method defined in claim 1 wherein the second material is injected into the center of the strip of the first material through an extrusion orifice.

3. The method defined in claim 1 which includes the steps of slitting the tubular wall of the tubular element longitudinally and flattening the web formed by the longitudinally slit tubular wall to thereby form a flat belt-like strip.

4. The method defined in claim 1 wherein the first and second materials comprise synthetic resin materials.

5. The method defined in claim 4 wherein the first material comprises soft plasticized polyvinyl chloride and the second material comprises rigid polyvinyl chloride.

6. The method defined in claim 1 wherein the first and second materials are heated during bonding.

7. The method defined in claim 1 wherein a third material is interposed coaxially between the first and second materials.

8. The method defined in claim 1 wherein the closed path in which the composite strip is moved is of circular configuration.

9. The method defined in claim 1 wherein the second material is extruded into a core of circular cross-section.

10. A method of forming a reinforced hollow tubular element comprising the steps of: continuously extruding a strip of soft plastic matrix material; continuously extruding a core material having a comparatively high strength and simultaneously continuously extruding an intermediate material around said core material; continuously injecting said core material with said intermediate material disposed therearound into the center of said strip of matrix material; continuously extruding the thus disposed matrix, intermediate and core material to firmly, intimately and continuously bond said intermediate material to said core and matrix materials and thereby provide an axially advancing integrally reinforced composite strip; moving said composite strip laterally in a closed path corresponding to the cross-sectional configuration of the tubular element to be formed while simultaneously continuing the axial advance of said composite strip; and guiding said composite strip so that it winds upon itself in a helix wherein the soft plastic material of the adjacent loops of said helix bond to one another to form a continuous hollow tubular element having a strong integral spiral reinforcing core element embedded in the wall thereof.

11. The method defined in claim 10 wherein the core material comprises rigid polyvinyl chloride, the intermediate material comprises butadiene acrylonitrile rubber and the matrix material comprises natural rubber.

12. The method defined in claim 10 wherein the closed path in which the composite strip is moved is of circular configuration.

13. The method defined in claim 10 wherein the core material is extruded into a core of circular cross-section.

14. The method defined in claim 10 which includes the steps of continuously slitting the tubular wall of the tubular element longitudinally and flattening the web formed by the longitudinally slit tubular wall to thereby form a flat belt-like strip.

References Cited

UNITED STATES PATENTS

| | | | |
|---|---|---|---|
| 2,748,805 | 6/1956 | Winstead | 156—195 |
| 3,013,921 | 12/1961 | Jacobson | 156—191 |
| 3,227,596 | 1/1966 | Knowles | 161—144 |
| 2,501,690 | 3/1950 | Prendergast | 264—173 |
| 2,632,205 | 3/1953 | Fitz Harris | 264—173 |

MORRIS SUSSMAN, *Primary Examiner.*

U.S. Cl. X.R.

18—13; 138—132; 156—195, 244; 161—144; 264—171, 173